United States Patent [19]
Challberg

[11] Patent Number: 5,353,319
[45] Date of Patent: Oct. 4, 1994

[54] REMOVABLE FEEDWATER SPARGER ASSEMBLY

[75] Inventor: Roy C. Challberg, Livermore, Calif.

[73] Assignee: General Electric Company, San Jose, Calif.

[21] Appl. No.: 92,098

[22] Filed: Jul. 16, 1993

[51] Int. Cl.⁵ .................................. G21C 9/00
[52] U.S. Cl. ......................... 376/286; 376/352
[58] Field of Search .......................... 376/352, 286

[56] References Cited

U.S. PATENT DOCUMENTS 4,081,325  3/1978  Aubert et al. ................... 376/352
4,259,156  5/1981  Neuenfeldt et al. ............. 376/352

Primary Examiner—Donald P. Walsh
Assistant Examiner—Frederick H. Voss
Attorney, Agent, or Firm—J. S. Beulick

[57] ABSTRACT

A removable feedwater sparger assembly includes a sparger having an inlet pipe disposed in flow communication with the outlet end of a supply pipe. A tubular coupling includes an annular band fixedly joined to the sparger inlet pipe and a plurality of fingers extending from the band which are removably joined to a retention flange extending from the supply pipe for maintaining the sparger inlet pipe in flow communication with the supply pipe. The fingers are elastically deflectable for allowing engagement of the sparger inlet pipe with the supply pipe and for disengagement therewith.

18 Claims, 5 Drawing Sheets

REMOVABLE FEEDWATER SPARGER ASSEMBLY

The U.S. Government has rights in this invention in accordance with contract DE-AC03-90SF18494 awarded by the Department of Energy.

The present invention relates generally to nuclear reactors, and, more specifically, to a removable feedwater sparger in a boiling water reactor (BWR).

BACKGROUND OF THE INVENTION

In a typical boiling water nuclear reactor, a nuclear reactor core is submerged in water in an annular reactor pressure vessel for heating the water to generate steam which is used to power a steam turbine-generator for producing electrical power for example. In order to replace the water lost by the production of steam, one or more feedwater spargers are provided inside the pressure vessel and supplied with feedwater through feedwater nozzles extending through the pressure vessel to maintain a nominal level of water therein.

The water within the reactor pressure vessel is typically circulated therein by pumps for cooling the reactor core. In alternate designs, pumps are not used for water circulation, but natural circulation is used instead in one type of reactor called a simplified boiling water reactor (SBWR). However, to achieve a suitable driving head for recirculation flow, the vessel includes a relatively high chimney positioned above the reactor core and radially inwardly from the inner surface of the vessel to form an annular downcomer therebetween. The chimney includes suitable vertical partitions therein for maximizing the upward buoyancy effects of the heated steam and water mixture from the core, with relatively cool water flowing downwardly through the downcomer since it has a higher density. The feedwater is introduced into the vessel at the top of the downcomer and is relatively cold water which joins the downcomer flow in the natural recirculation within the pressure vessel.

The feedwater sparger may be in the form of a full 360° ring disposed at the top of the downcomer or may be in the form of a plurality of arcuate feedwater spargers which collectively form the ring. In either embodiment, the spargers occupy the space at the top of the downcomer and thusly reduce access to the relatively narrow downcomer annulus, which is undesirable during a maintenance outage of the reactor. During such an outage, access is required in the region between the chimney and the vessel for inspection and/or maintenance thereof as well as for access to the various nozzles located in the downcomer region below the spargers. Accordingly, a removable feedwater sparger is desired for providing access to the downcomer during a maintenance outage of the reactor.

SUMMARY OF THE INVENTION

A removable feedwater sparger assembly includes a sparger having an inlet pipe disposed in flow communication with the outlet end of a supply pipe. A tubular coupling includes an annular band fixedly joined to the sparger inlet pipe and a plurality of fingers extending from the band which are removably joined to a retention flange extending from the supply pipe for maintaining the sparger inlet pipe in flow communication with the supply pipe. The fingers are elastically deflectable for allowing engagement of the sparger inlet pipe with the supply pipe and for disengagement therewith.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT

Figure 1:
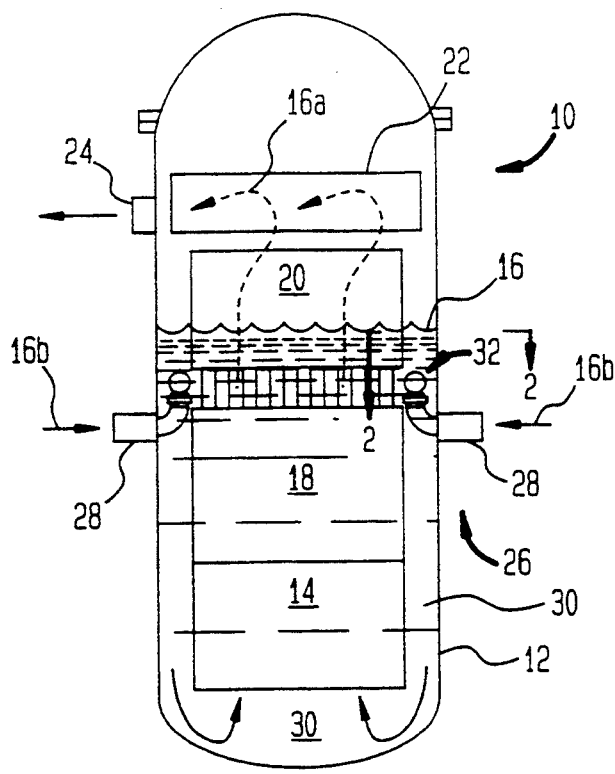
FIG. 1 is a schematic, elevational view of an exemplary boiling water reactor having a removable feedwater sparger assembly in accordance with one embodiment of the present invention.

Illustrated schematically in FIG. 1 is an exemplary boiling water reactor (BWR) 10 which includes an annular reactor pressure vessel 12 having a nuclear reactor core 14 submerged in coolant water 16. In this exemplary embodiment, the reactor illustrated is a simplified boiling water reactor (SBWR) which relies on natural recirculation of the water 16 therein instead of driven pumps for circulating the water therein. Accordingly, a conventional annular chimney 18 extends upwardly from the core 14 and includes a plurality of vertical, spaced apart partitions (not shown) for channeling upwardly the water heated by the core 14 to generate steam 16a. Disposed at the top of the chimney 18 are a plurality of conventional steam separators 20 having conventional tubular standpipes disposed in flow communication with the chimney 18. A portion of the steam 16a is separated from the water vapor and is further channeled upwardly into a conventional steam dryer 22 which removes further water vapor therefrom prior to discharging the steam 16a from the vessel 10 through a conventional outlet nozzle 24.

To replenish the water 16 lost from the vessel 12 due to the steam 16a discharged therefrom, a feedwater sparger assembly 26 which is removable in accordance with the present invention is provided at the top of the chimney 18 around the inner circumference of the pressure vessel 12. The assembly 26 includes one or more conventional feedwater nozzles 28 through the vessel 12 which provide feedwater 16b into the vessel 12 from a suitable external source. The core 14 and the chimney 18 are spaced radially inwardly from the inner circumference of the vessel 12 to define an annular downcomer 30 therebetween in which flows downwardly by natural circulation the relatively cold feedwater 16b mixed with the water 16 in the vessel 12. The core 14 heats the reactor water 16 which decreases its density and causes it to rise upwardly through the chimney 18, while the relatively cool and denser water in the downcomer 30 flows downwardly to the bottom of the pressure vessel 12, wherein it turns upwardly and enters the core 14. Accordingly, a recirculation flowpath is created by the water and steam which flows upwardly through the chimney 18 and then laterally into the top of the downcomer 30 wherein the heated reactor water 16 is mixed with the cooler feedwater 16b and flows downwardly in the downcomer 30.

Figure 2:
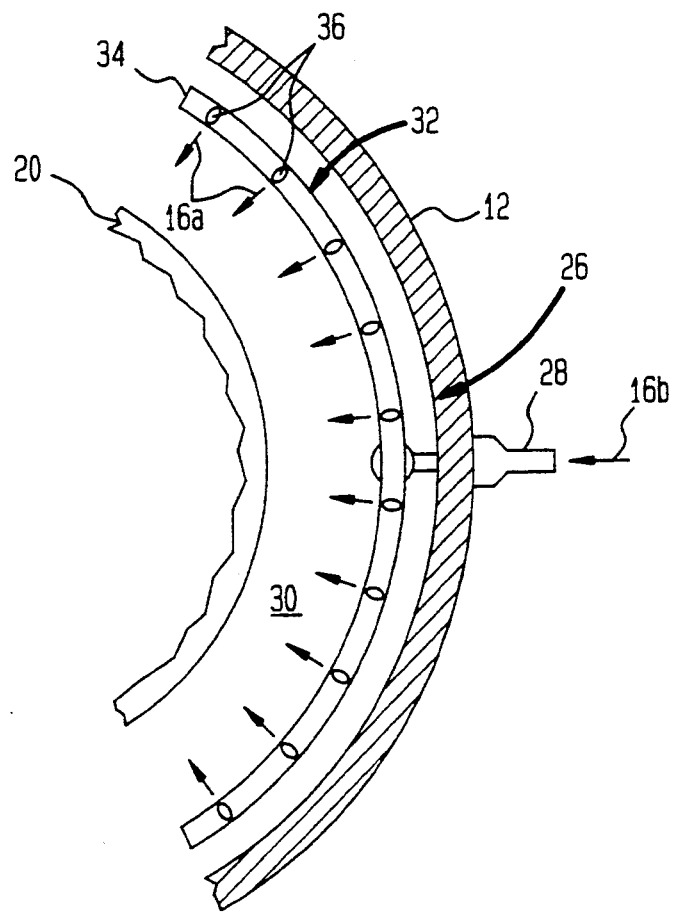
FIG. 2 is a top, partly sectional view of a portion of the feedwater sparger assembly joined to the pressure vessel of FIG. 1 and taken along line 2—2.

During a maintenance outage, the top head of the pressure vessel 12 is conventionally removed, followed in turn by the steam dryer 22 and the steam separators 20 if required. And, in order to get access to the downcomer 30 below the sparger assembly 26 for inspection and maintenance in the downcomer 30, the sparger assembly 26 is removable in accordance with the present invention. Referring to FIG. 2, the assembly 26 may include one or more arcuate feedwater spargers 32. The sparger 32 includes an arcuate, horizontal header pipe 34 having a plurality of circumferentially spaced injector nozzles 36 disposed in flow communication therewith at the top thereof for injecting the feedwater 16b into the downcomer 30. Although the sparger 32 and the header pipe 34 may be full 360° rings, in the exemplary embodiment illustrated in FIGS. 1 and 2, four identical circumferentially spaced apart arcuate header pipes 34 are used which collectively extend about 270° of the full circumference of the downcomer 30.

Figure 3:
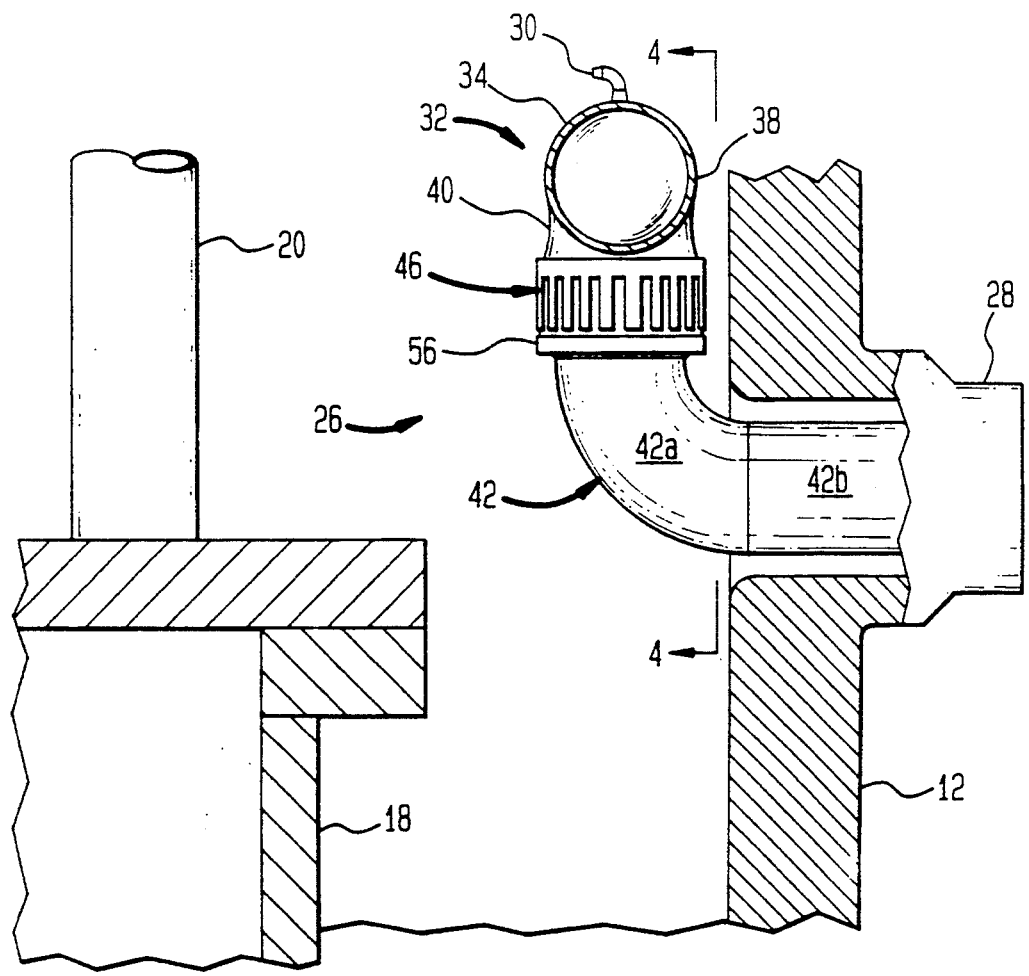
FIG. 3 is an enlarged, partly sectional, elevational view of a portion of the feedwater sparger assembly supported by the pressure vessel of FIG. 1 and disposed over an annular downcomer.
Figure 4:
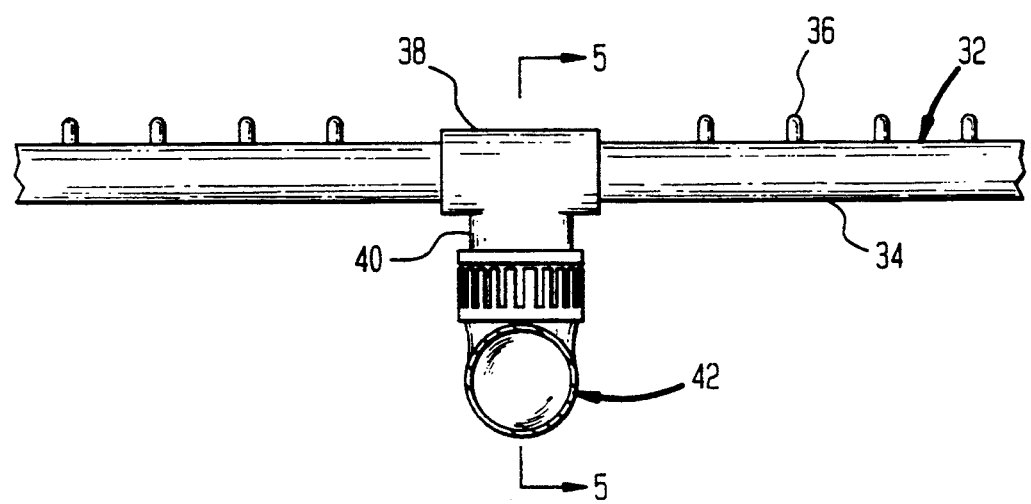
FIG. 4 is a partly sectional, elevational view of a portion of the feedwater sparger assembly illustrated in FIG. 3 and taken along line 4—4.

As shown with more particularity in FIGS. 3 and 4, the sparger 32 includes a conventional reducing or coupling pipe tee 38 disposed at an intermediate portion of the header pipe 34, with the trunk of the tee 38 defining a vertical inlet pipe 40 for the sparger 32 for channeling the feedwater 16b through the two branches of the tee 38 circumferentially in opposite directions into the header pipe 34 for discharge from the injector nozzles 36.

Figure 5:
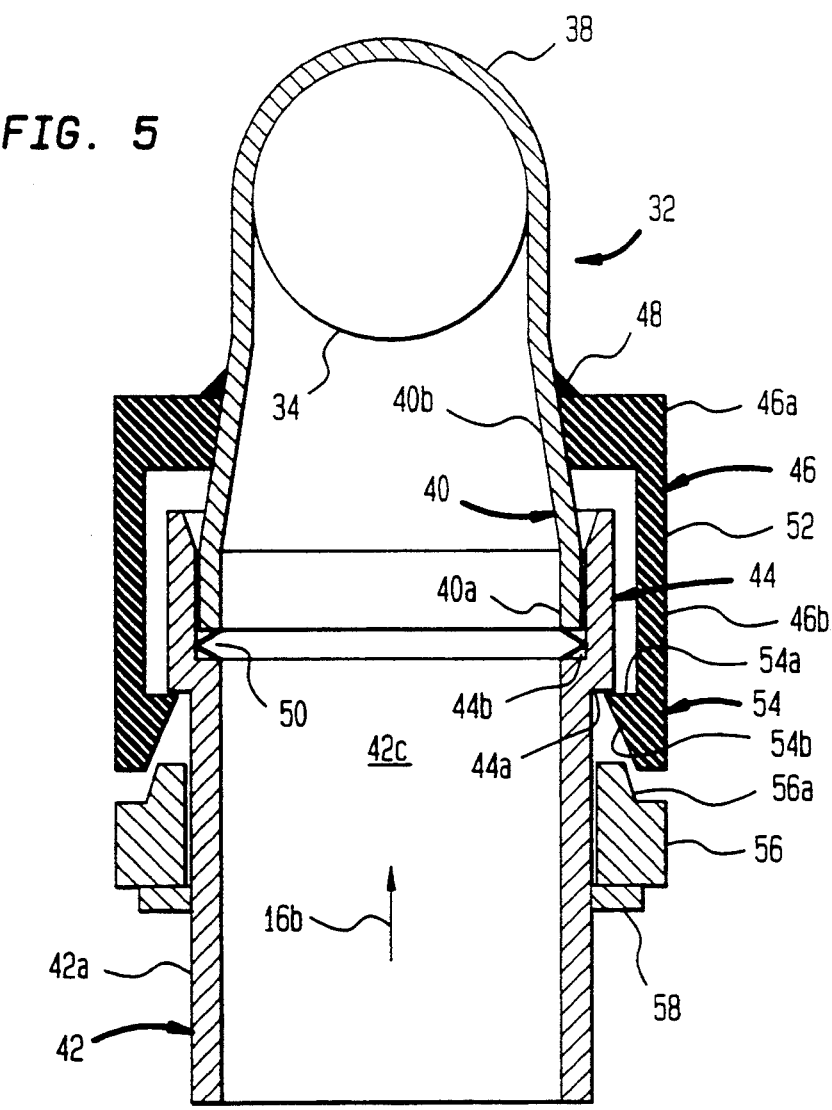
FIG. 5 is an elevational, sectional view through the feedwater sparger and coupling illustrated in FIG. 4 and taken along line 5—5.

As illustrated in cross-section in FIG. 5, the inlet pipe 40 has an annular distal end 40a and an intermediate portion 40b spaced longitudinally upwardly therefrom. Referring to both FIGS. 3 and 5, a supply pipe 42 includes a 90° elbow 42a and an integral cylindrical thermal sleeve 42b extending horizontally from the elbow 42a in conventional flow communication with the inside of the feedwater nozzle 28 for receiving therefrom the feedwater 16b. The supply pipe elbow 42a has an upwardly facing outlet end 42c as illustrated in FIG. 5 for receiving therein the inlet pipe distal end 40a in flow communication therewith for channeling the feedwater 16b from the supply pipe 42 to the inlet pipe 40 to feed the sparger 32. The supply pipe outlet end 42c includes an annular, radially outwardly extending retention flange 44 which mates with a tubular sleeve or coupling 46 joined to the inlet pipe 40. The coupling 46 is shown in cross-section in FIG. 5 and in perspective in FIG. 6 and includes an annular band 46a at a proximal end thereof fixedly joined coaxially with the intermediate portion 40b of the sparger inlet pipe 40 by a conventional weld 48. The coupling 46 also includes a plurality of circumferentially spaced, elongate fingers 46b extending longitudinally and vertically from the band 46a and integral therewith. The fingers 46b are removably hooked or joined to the retention flange 44 for maintaining the sparger inlet pipe 40 in flow communication with the supply pipe 42, while allowing relatively easy disassembly thereof during the maintenance outage.

As illustrated in FIG. 5, the retention flange 44 is preferably cylindrical and defines with an outer surface of the supply pipe 42 an annular, horizontal outer seat or ledge 44a for capturing the coupling fingers 46b thereon. The retention flange 44 also defines with an inner surface of the supply pipe 42 an annular, horizontal inner seat or ledge 44b for receiving therein the inlet pipe distal end 40a in a male and female coupling arrangement.

An elastic or flexible annular seal 50 rests on the inner ledge 44b and is disposed between the inlet pipe distal end 40a and the inner ledge 44b and is sized for being elastically compressed therebetween upon engagement of the fingers 46b and the retention flange 44. In the exemplary embodiment illustrated in FIGS. 5 and 7, the seal 50 is a conventional Belleville seal made from a suitable metal which provides both sealing and elastic compression capability. Other types of suitable seals such as metallic O-rings or resilient metal seals may also be used.

Figure 6:
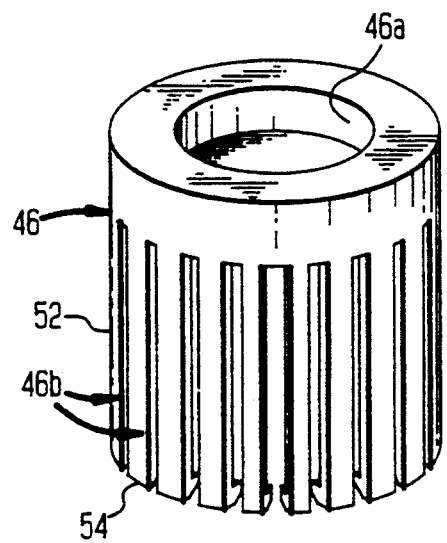
FIG. 6 is a perspective view of the coupling illustrated in FIG. 5 removed from the feedwater sparger assembly.
Figure 7:
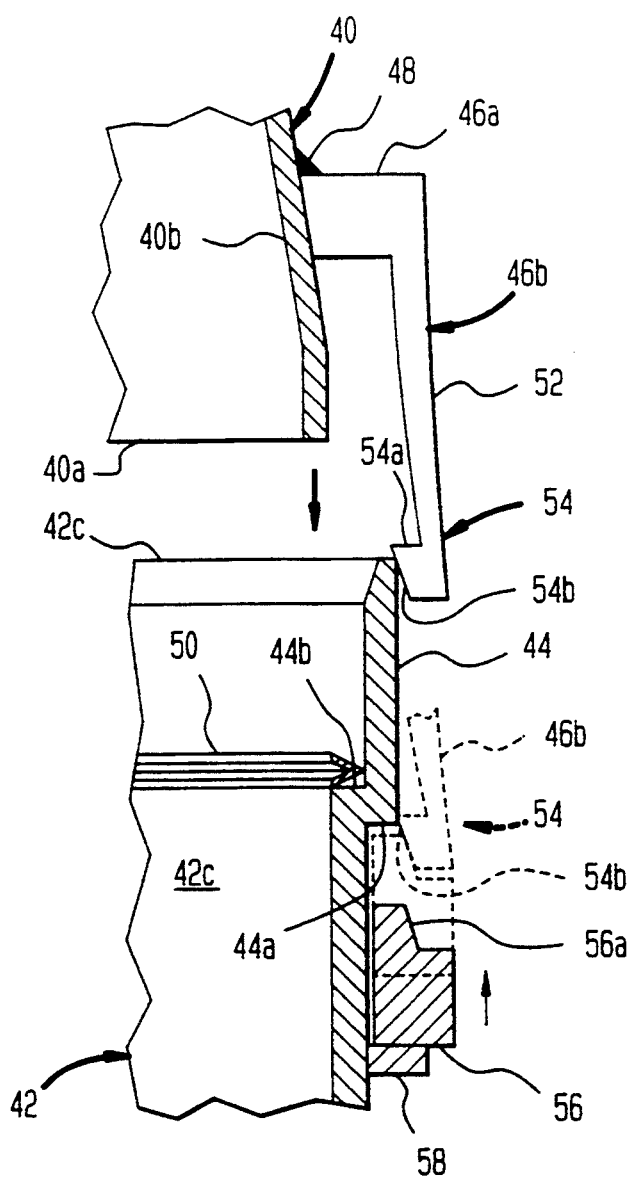
FIG. 7 is an exploded view of a portion of the sparger inlet pipe and supply pipe illustrating initial engagement in solid line and disengagement in phantom line of the coupling illustrated in FIGS. 5 and 6.

As shown in FIGS. 6 and 7, each of the fingers 46b includes an elongate, flexible beam 52 extending integrally from the band 46a and spaced parallel to adjacent ones of the beams 52. Disposed at a distal end of each of the beams 52 is a hook 54 defined by a flat seat 54a disposed parallel to the outer ledge 44a as illustrated in FIG. 5 for retention thereon, and a ramp 54b inclined radially outwardly from the seat 54a and integral therewith. As illustrated with more particularity in FIG. 7, the ramp 54b is configured for engagement with the supply pipe outlet end 42c by having an initially smaller diameter relative thereto to displace radially outwardly or elastically expand the fingers 46b over the retention flange 44 upon installation and translation downwardly of the inlet pipe 40 into the supply pipe 42 until the hooks 54 contract or snap radially inwardly and latch the outer ledge 44a as illustrated in FIG. 5. The lengths of the fingers 46b are selected to ensure that the seal 50 is slightly compressed between the inlet pipe distal end 40a and the inner ledge 44b upon engagement of the hooks 54 with the outer ledge 44a. This ensures an effective seal for reducing or preventing leakage of the feedwater 16b through the joint between the inlet pipe 40 and the supply pipe 42 as well as provide a vibration-resistant joint.

Since the supply pipe outlet end 42c faces upwardly, and the sparger inlet pipe 40 extends vertically with the distal end 40a thereof facing downwardly toward the supply pipe outlet 42c, the sparger 32 may be readily installed by simple downward movement and insertion of the sparger inlet pipe 40 into the supply pipe outlet end 42c, with engagement of the fingers 46b with the retention flange 44 maintaining the assembly together.

In order to allow relatively easy disassembly of the sparger 32 from the supply pipe 42, an annular release collar 56 as illustrated in FIGS. 5 and 7 is loosely or slidably disposed around the supply pipe 42 adjacent to and below the retention flange 44 and the fingers 46b. The release collar 56 includes a frustoconical, or simply conical cam surface 56a for selectively engaging the fingers 46b upon longitudinal upward translation thereof to displace the fingers 46b radially outwardly from the retention flange 44 for disengagement therewith as illustrated in phantom line in FIG. 7. As illustrated in FIG. 7, the hook ramp 54b is also configured for engagement with the release collar cam surface 56a upon translation of the cam surface 56a upwardly against the several ramps 54b to expand radially outwardly the fingers 46b to disengage the hooks 54 from the outer ledge 44a for removing the inlet pipe 40 and the sparger 32 from the supply pipe 42.

As shown in FIGS. 5 and 7, an annular support collar 58 is fixedly joined to the supply pipe 42, on the elbow 42a, by welding for example, and below the release collar 56 for supporting the release collar 56 and maintaining it in ready position. Accordingly, when desired, the release collar 56 may be manually translated upwardly, using suitable pneumatic jacks for example, to spread apart the fingers 46b and release the coupling 46 from the retention flange 44 to remove the sparger 32.

As illustrated in FIG. 5, the retention flange 44 is preferably sized to fit completely within the coupling 46 axially between the band 46a and the hooks 54 and radially inwardly of the beams 52. In this way, a compact joint is created which does not reduce the inner diameter or flow area between the supply pipe 42 and the inlet pipe 40.

The various components of the sparger assembly 26 are made of conventional metals for the nuclear environment. However, in a preferred embodiment of the present invention, the coupling 46 preferably is made of a material such as conventional Inconel X-750, which has a lower coefficient of thermal expansion than the materials of the supply pipe 42 and the inlet pipe 40 cooperating therewith so that differential thermal expansion therebetween upon heating thereof in the reactor environment will additionally compress the seal 50 for increasing its effectiveness. In this way, the fingers 46b will expand less than the supply pipe 42 and the inlet pipe 40 between the coupling band 46a and the hooks 54 to tighten the seal joint during operation upon heating thereof.

Figure 8:
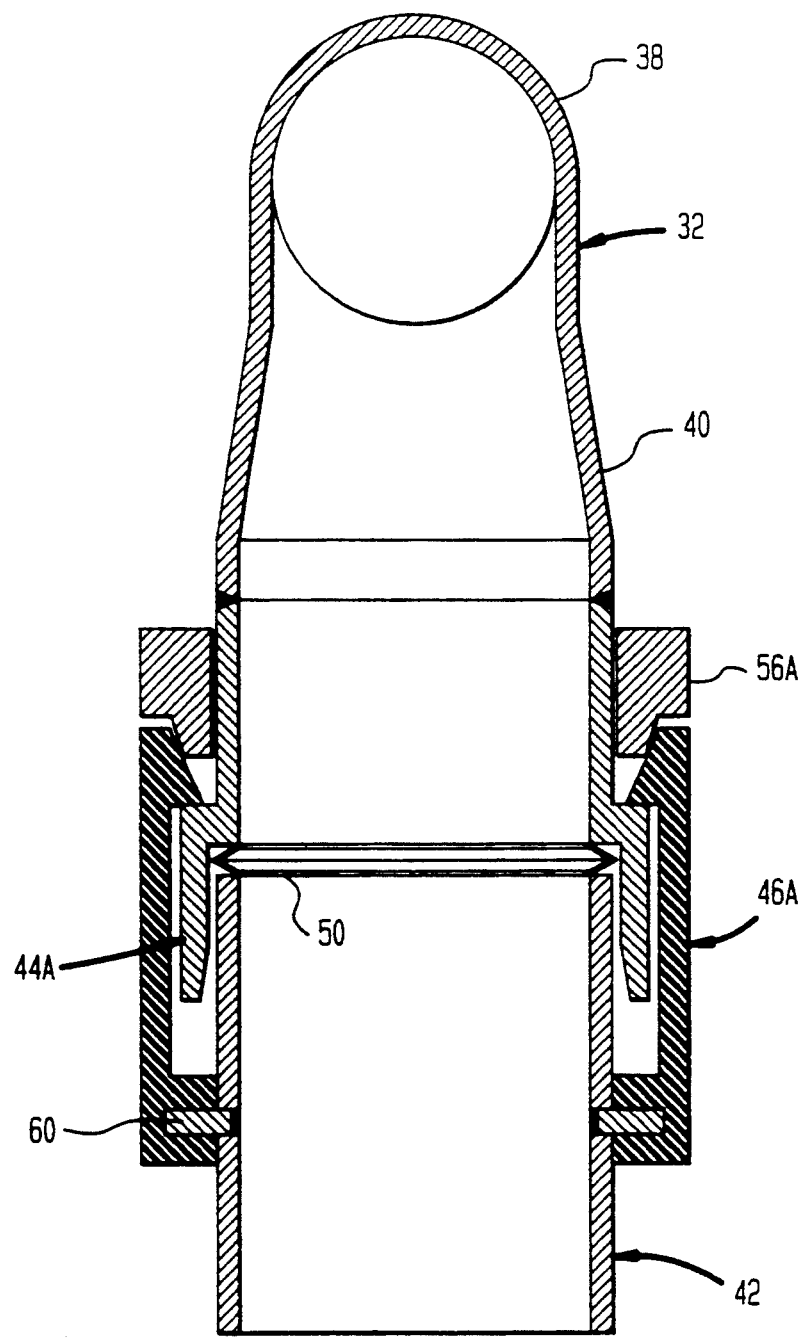
FIG. 8 is a sectional view of the sparger inlet pipe and supply pipe showing an alternate embodiment of the coupling.

Although the coupling 46 is joined to the inlet pipe 40 and the retention flange 44 is joined to the supply pipe 42 in the preferred embodiment, they may be interchanged in an alternate embodiment as shown in FIG. 8. In this embodiment, the retention flange 44A is integral with the distal end of the inlet pipe 40, the coupling 46A is joined to the supply pipe 42 by suitable pins 60, and the release collar 56A surrounds the inlet pipe 40. The joint still functions the same in this embodiment.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A removable feedwater sparger assembly comprising:
    an arcuate feedwater sparger having an inlet distal end;
    a supply pipe having an outlet end for receiving said inlet pipe distal end in flow communication therewith for channeling feedwater from said supply pipe to said inlet pipe to feed said sparger;
    an annular, radially outwardly extending retention flange disposed on one of said supply pipe outlet end and said inlet pipe distal end;
    a tubular coupling having an annular band at a proximal end fixedly joined coaxially with the other said supply pipe outlet end and said inlet distal end, and a plurality of circumferentially spaced elongate fingers extending longitudinally from said band, said fingers being flexibly removably joined to said retention flange for maintaining said sparger inlet pipe in flow communication with said supply pipe, wherein said retention flange comprises an annular outer ledge for capturing said coupling fingers thereon; and
    an annular release collar slidably disposed around said one of said supply pipe outlet end and said inlet pipe distal end adjacent to said fingers, and including a conical cam surface for selectively engaging said fingers upon longitudinal translation of said release collar to displace said fingers radially outwardly from said retention flange for disengagement therefrom, wherein each of said fingers includes an elongate, flexible beam extending integrally from said band and spaced parallel to adjacent ones of said beams, and a hook disposed at a distal end of said beam, said hook being defined by a seat disposed parallel to said outer ledge for retention thereon and a ramp inclined radially outwardly for abutment with said release collar, said ramp being configured to expand said fingers over said retention flange upon coupling of said inlet pipe to said supply pipe until said hooks contract and latch said outer ledge, and said ramp also being effective for engagement with said release collar cam surface upon translation thereof to expand said fingers to disengage said hooks from said outer ledge for removing said inlet pipe from said supply pipe.

2. An assembly according to claim 1, wherein:
    said inlet pipe includes an intermediate portion spaced from said distal end;
    said retention flange is disposed on said supply pipe outlet end; and
    said coupling band is fixed joined to said inlet pipe intermediate portion.

3. An assembly according to claim 2 wherein said retention flange is cylindrical and defines with an outer surface of said supply pipe an annular outer ledge for capturing said coupling fingers thereon, and defines with an inner surface of said supply pipe an annular inner ledge.

4. An assembly according to claim 3 further comprising an annular flexible seal disposed between said inlet pipe distal end and said inner ledge, and sized for being elastically compressed therebetween upon engagement of said fingers and said retention flange.

5. An assembly according to claim 1 wherein:
    said supply pipe comprises a 90° elbow with said supply pipe outlet end facing vertically upwardly, and an integral thermal sleeve extending horizontally from said elbow: and
    said sparger inlet pipe extends vertically with said distal end thereof facing downwardly toward said supply pipe outlet end.

6. An assembly according to claim 5 wherein said retention flange is sized to fit completely within said coupling axially between said band and said hooks and radially inwardly of said beams.

7. An assembly according to claim 6 wherein said sparger further comprises an arcuate, horizontal header pipe having a plurality of injector nozzles at the top thereof disposed in flow communication therewith, and a coupling tee disposed at an intermediate portion of said header pipe, with the trunk of said tee defining said sparger inlet pipe to channel feedwater through the branches of said tee into said header pipe for discharge from said injector nozzles.

8. An assembly according to claim 6 further comprising an annular support collar fixedly joined to said supply pipe below said release collar for supporting said release collar.

9. An assembly according to claim 6 wherein said coupling has a lower coefficient of thermal expansion than said supply and inlet pipes for further compressing said seal upon heating thereof.

10. An assembly according to claim 6 wherein said seal is a Belleville seal.

11. A removable feedwater sparger assembly for receiving feedwater from a feedwater nozzle of a boiling water reactor, comprising:
- a supply pipe in flow communication with said feedwater nozzle;
- a header pipe having a plurality of injector nozzles;
- an inlet pipe in flow communication with said header pipe; and
- hooking means for coupling said supply pipe to said inlet pipe in a first state and uncoupling said supply and inlet pipes in a second state.

12. The removable feedwater sparger assembly as defined in claim 11, further comprising releasing means movable from a first position whereat said releasing means are disengaged from said hooking means to a second portion whereat said releasing means engage said hooking means, said hooking means changing from said first state to said second state in response to movement of said releasing means from said first position to said second position.

13. The removable feedwater sparger assembly as define in claim 12, wherein said releasing means comprise first camming surfaces and said hooking means comprise second camming surfaces, said first camming surfaces bearing against said second camming surfaces during said movement of said releasing means from said first position to said second position.

14. The removable feedwater sparger assembly as defined in claim 13, further comprising a retention flange integrally connected to one of said supply pipe and said inlet pipe, wherein said hooking means comprise a plurality of radially outwardly flexible fingers connected to the other of said supply pipe and said inlet pipe, each of said fingers having a hook for latching onto said retention flange when said hooking means are in said first state.

15. A removable feedwater sparger assembly for receiving feedwater from a feedwater nozzle of a boiling water reactor, comprising:
- a first piping means in flow communication with said feedwater nozzle;
- a header pipe having a plurality of injector nozzles;
- a second piping means in flow communication with said header pipe; and
- first and second latching means for coupling said first piping means to said second piping means in a first state and uncoupling said first and second piping means in a second state, said first latching means being connected to one of said first and second piping means and said second latching means being connected to the other of said first and second piping means,
- wherein said first latching means comprises a radial retaining surface and said second latching means comprises a plurality of radially outwardly flexible hooking members, said hooking members having a first radial position in said first state whereat said hooking members engage said radial retaining surface and a second radial position in said second state whereat said hooking members are disengaged from said radial retaining surface, said second radial position being located radially outward of said first radial position.

16. The removable feedwater sparger assembly as defined in claim 15, further comprising releasing means movable from a first position whereat said releasing means are disengaged from said latching means to a second position whereat said releasing means engage said latching means, said latching means changing from said first state to said second state in response to movement of said releasing means from said first position to said second position.

17. The removable feedwater sparger assembly as define in claim 16, wherein said releasing means comprise second camming surfaces and said latching means comprise second camming surfaces, said first camming surfaces bearing against said second camming surface during said movement of said releasing means from said first position to said second position.

18. The removable feedwater sparger assembly as defined in claim 15, further comprising resilient sealing means arranged between said first and second piping means, said resilient sealing means urging said first and second piping means apart in said first state.

* * * * *